United States Patent
Martin

[15] 3,667,027
[45] May 30, 1972

[54] INVERTER CIRCUIT WITH STABILIZED FREQUENCY UNDER ALL LOAD CONDITIONS

[72] Inventor: Ricky Martin, Los Angeles, Calif.
[73] Assignee: Bell Electronic Corp.
[22] Filed: Mar. 30, 1971
[21] Appl. No.: 129,477

[52] U.S. Cl. .................................321/11, 321/18, 321/45 R
[51] Int. Cl. .................................................H02m 1/18
[58] Field of Search.....................321/11, 18, 45; 331/113 A

[56] References Cited
UNITED STATES PATENTS

| | | | |
|---|---|---|---|
| 3,408,553 | 10/1968 | Bishop | 321/16 |
| 3,584,289 | 6/1971 | Bishop et al. | 321/11 X |
| 3,219,906 | 11/1965 | Keller et al. | 321/45 R |
| 3,324,377 | 6/1967 | Mills | 321/16 |

*Primary Examiner*—William M. Shoop, Jr.
*Attorney*—Pastoriza & Kelly

[57] ABSTRACT

An inverter circuit utilizing a saturable core driving transformer to drive the switch elements includes a generator to pass a stabilized frequency square wave to the driving transformer to stabilize the switching frequency of the inverter to match the stabilized frequency of the square wave. Additional switch means coupled to the driving transformer are responsive to the square wave to short circuit, alternately, portions of the driving transformer at points in time at which the square wave changes polarity thereby forcing the flux to reverse and prevent any frequency drift should the feedback current from the output transformer of the inverter exceed the current supplied by the square wave signal. The additional switches also serve to hold the inverter in an off condition by turning both switches on simultaneously.

5 Claims, 1 Drawing Figure

3,667,027

INVENTOR.
RICKY MARTIN
BY Pastoriza & Kelly
ATTORNEYS

INVERTER CIRCUIT WITH STABILIZED FREQUENCY UNDER ALL LOAD CONDITIONS

This invention relates generally to d.c. to a.c. converters and more particularly to an improved solid state inverter circuit providing a stabilized output frequency.

BACKGROUND OF THE INVENTION

Solid state inverter circuits for converting a d.c. input signal to an a.c. output signal are well known in the art. Generally, these circuits include first and second switching transistors cooperating with a saturable core output transformer and a suitable transformer feedback means coupled to the base terminals of the transistors to effect switching upon saturation of the output transformer. The d.c. input is normally connected between a center tap on the output transformer and the emitter terminals of the transistors.

Two problems have been encountered with inverters of the above type. First, the output a.c. signal frequency tends to vary as a function of load and also as a function of any variation in input d.c. voltage. Second, there are no simply means for assuring a shutoff of the inverter circuit. Efforts to solve the first problem have involved careful regulation of the d.c. input voltage and various auxiliary circuits to compensate for changes in load. While some improvement is obtained, the actual output frequency cannot always be stabilized at a desired value. With respect to the second problem of shutting off the inverter, the d.c. voltage supply is simply disconnected from the circuit.

BRIEF DESCRIPTION OF THE INVENTION

With the foregoing consideration in mind, the present invention comprehends additional circuitry in combination with the conventional type inverter circuit which will assure a stabilized frequency at a desired value and also provide a very simple means for shutting off the inverter and holding it off.

More particularly, in accord with the invention a generator means is connected to pass a frequency stabilized signal, such as a square wave, to a driving transformer coupled by feedback means to the output transformer to stabilize the switching frequency of the switching transistors to match the stabilized frequency of the signal itself. The power supplied by this generator need only be sufficient to drive the inverter under no load conditions.

Under heavy loading conditions of the inverter, the feedback current is sometimes greater than the current supplied by the aforementioned generator means to the driving transformer. As a consequence, the frequency could vary. To prevent such a condition, the additional circuitry also includes switch means such as SCR's connected to short circuit portions of the driving transformer at points in time at which the generated frequency stabilized signal, such as the square wave, changes polarity. Effectively, the switches reverse the flux in the driving transformer thereby assuring switching of the inverter transistors and preventing any frequency drift should the feedback current from the output transformer exceed the current supplied by the frequency stabilized signal.

Finally, with the provision of the switches, both may be turned on at the same time thereby shutting off the inverter and holding it off.

BRIEF DESCRIPTION OF THE DRAWINGS

A better understanding of the invention will be had by referring to the accompanying drawings in which.

DETAILED DESCRIPTION OF THE PREFERRED EMBODIMENT

Figure 1:
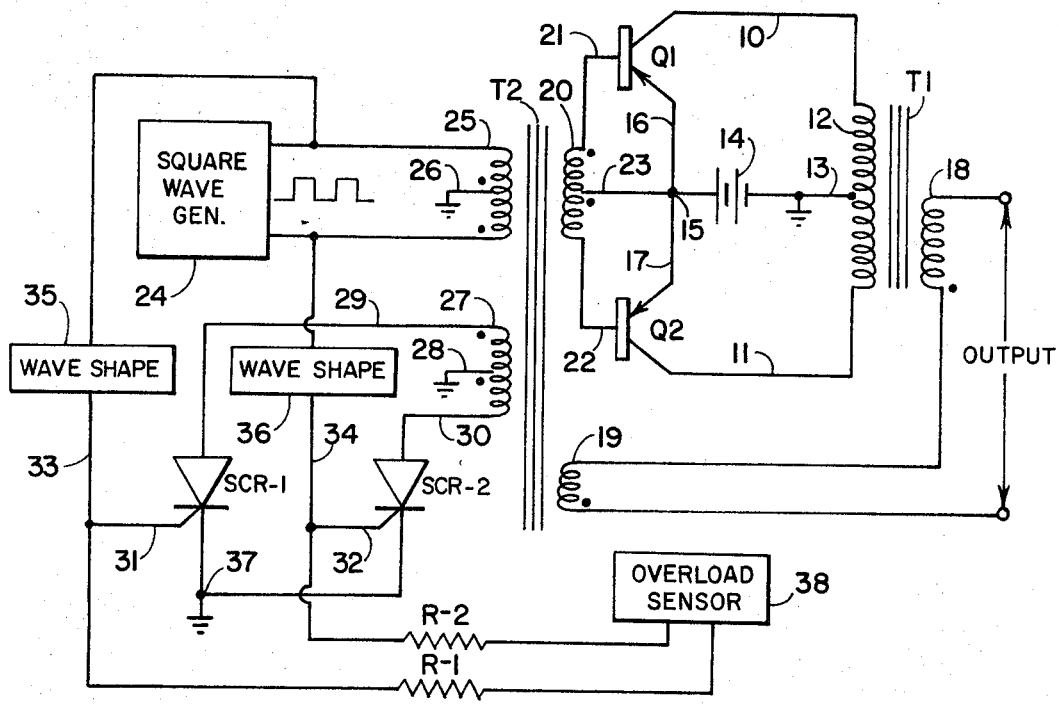
FIG. 1 is a circuit diagram of the improved inverter of the present invention.

Referring first to FIG. 1 there is shown in the upper right hand portion of the drawing an inverter circuit including switching transistors Q1 and Q2 cooperating with an output transformer T1.

The collector terminals for the transistors Q1 and Q2 are shown at 10 and 11 connecting to opposite ends of the primary coil 12 for the output transformer T1. This coil is center tapped to ground as indicated at 13. A d.c. input source such as a battery 14 connects between the center tap 13 and a juncture point 15 to which emitter terminals 16 and 17 for the transistors connect respectively.

The secondary of the output transformer T1 is shown at 18 and includes a transformer feedback means including coil 19 flux coupled with a driving transformer T2 including a driving coil 20 connecting to the base terminals 21 and 22 of the switching transistors. The coil 20 is center tapped at 23 to the junction point 15. While the feedback means is taken from the secondary output coil 18 of the transformer T1, this feedback could be taken from the primary coil 12 if desired.

In a conventional inverter, there would not be a driving transformer T1 but only a feedback to the base terminals and the output transformers would saturate. Thus considering the elements described thus far as a conventional inverter, if Q1 conducts first, current will pass from the battery 14 through the emitter and collector leads 16 and 10 to the upper side of the output transformer primary coil 12 and then from the center tap 13 to the other side of the d.c. source or ground. The current will build up in the portion of the primary coil 12 between the collector lead 10 and center tap 13. This buildup will be reflected in the output coil 18, feedback coil 19, and drive coil 20, the polarity being such as to make the voltage on the base terminal 21 more negative and the voltage on the base terminal 22 more positive. The transistor Q2 is thus positively held cut off while the transistor Q1 becomes fully conducting.

When the output transformer T1 becomes saturated, there will be a reversal in the flux which is reflected back through the feedback coils to the bases of the transistors all of a sudden making the base 21 positive for the transistor Q1 thereby cutting it off and making the base 22 for the transistor Q2 negative thereby turning it on. The process described in conjunction with transistor Q1 is then carried out by transistor Q2, the buildup of current in the lower portion of the coil 12 resulting in a further positive shutting off of the transistor Q1 and a turning on to complete conduction of the transistor Q2. When saturation is again reached, a reversal takes place so that the inverter simply switches again.

From the above description, it will be evident that the conventional inverter would simply switch back and forth at a free running frequency determined by the characteristics of the output transformer T1 also the value of the initially applied d.c. input voltage. It will also be evident that should the input voltage vary, the free running switching frequency will vary and similarly, should the load across the output of the transformer T1 vary, the saturation time of the transformer T1 will vary, thus varying the free running frequency.

Finally, it will be clear from a consideration of only those components described that the inverter cannot be turned off without disconnecting the battery 14.

In order to provide a stabilized output frequency at a desired value under all load conditions, there is provided, in accord with the invention, the additional circuitry including the driving transformer T2 which saturates rather than the output transformer. In the particular example of FIG. 1, a generating means takes the form of a square wave generator 24 having its output connected to opposite ends of primary coil 25 flux coupled through the driving transformer T2 to the driving coil 20. The coil 25 is center tapped to ground at 26.

Another coil 27 center tapped to ground at 28 is flux coupled to the driving transformer T2 as shown and has its outer winding terminals connected as at 29 and 30 to the anodes of first and second silicon controlled rectifiers SCR-1 and SCR-2. The control gate terminals for these rectifiers are shown at 31 and 32 connecting through lines 33 and 34 and wave shaping circuits 35 and 36 to the output lines of the square wave generator 24, respectively. The cathodes of the switches connect together to ground as at 37. These two silicon controlled rectifiers SCR-1 and SCR-2 constitute switch means for effectively shorting out portions of the driving transformer T2 to force a reversal of the flux in the driving transformer when either switch is closed or in a conducting state. This condition occurs each time the square wave reverses in polarity. While silicon controlled rectifier type switches have been shown, any suitable solid state or equilalent switch could be used.

The circuit is completed by an overload sensor 38 connecting through resistances R1 and R2 to the gate control terminals 31 and 32 of the silicon controlled rectifiers.

Figure 2:
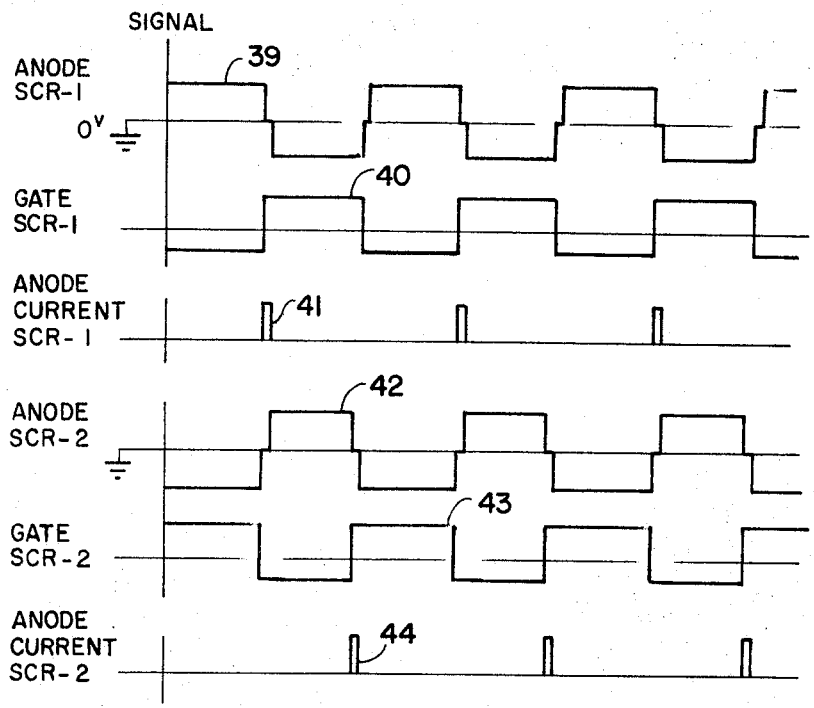
FIG. 2 shows various wave forms useful in explaining the operation of the circuit of FIG. 1.

FIG. 2 illustrates at 39 and 40 wave forms which represent those periods of time when a positive signal appears on the anode and gate of the switch SCR-1. The pulses 41 in turn represent the anode current from the SCR-1 switch; that is, the time the same is conducting. The switch SCR-1 will conduct or close only when its gate is triggered to a positive voltage such as indicated at 40 in FIG. 2 and its anode has not reversed completely from a positive to negative value. The conduction period shown by the pulses 41 is thus very short.

Similarly, wave forms 42, 43 and 44 depict the conditions of SCR-2 which conducts on alternate crossover points of the square wave since its gate signal is 180° out of phase with the gate signal on SCR-1.

A positive voltage may be supplied to both the gate control terminals 31 and 32 by providing a given signal such as from the overload sensor 38. Operation of both of the switches simultaneously will render the driving transformer inoperative thereby turning off the inverter circuit and holding it off.

OPERATION

The polarities of the various coils described in FIG. 1 at any one instance of time are indicated by the black dots. Assume that the ends of the coils adjacent the black dots are simultaneously positive. At such point in time, the transistor Q2 will be conducting and the transistor Q1 shut off. The square wave output from the generator 24 will be opposite to the signal in the driving coil 20 as indicated by the black dots. Switching of the square wave from the generator 24 from negative to positive will trigger SCR-1 to force a reversal of the flux in the driving transformer thereby reversing the polarity on the drive coil 20. Transistor Q1 is switched on and transistor Q2 is switched off. When the change in polarity from the square wave generator is received, SCR-2 is triggered forcing a reversal in flux in the driving transformer so that transistor Q1 is turned off and transistor Q2 is turned on. In otherwords, the frequency stabilized signal in the form of the square wave from the square wave generator 24 will control switching of the SCR's thereby reversing the flux in the driving transformer at precise points in time to thus switch the transistors Q1 and Q2 so that the frequency of the inverter circuit matches that of the square wave.

In one sense, the switches SCR-1 and SCR-2 may be considered in effect, as removing current from the driving transformer by short circuiting portions of the transformer upon operation. As noted, the conduction periods occur at the precise crossover points of the square wave so that exact synchronism is maintained and the inverter transistors Q1 and Q2 will always be under control of the square wave from the square wave generator 24.

From the foregoing, it will be evident that not only is the frequency of operation of the inverter circuit stabilized but the stabilized value can be a desired selected value depending upon the frequency value of the signal from the generator. Thus, an inverter circuit can be made to operate at a controlled desired stabilized frequency.

With the circuit as described in FIG. 1, it is a simple matter to turn off the inverter completely and hold it turned off. Such can readily be accomplished by means of the overload sensor 38 which can provide a given positive signal to the gates 31 and 32 of the switches SCR-1 and SCR-2 simultaneously thereby shorting out completely the coil 27.

If desired, the overload sensor can be made automatically responsive to a given overload which will provide the necessary positive signal to cause both SCR switches to conduct simultaneously.

It will be understood that in the present invention, the output transformer is never driven into saturation and the natural saturable frequency of the driver transformer is always lower than the lowest frequency provided by the stabilized frequency signal generator.

From the foregoing description, it will be evident that the present invention has provided an improved inverter circuit wherein problems heretofore associated with frequency stability and turning off of the inverter circuit have been resolved.

What is claimed is:

1. An inverter circuit having first and second switching transistors, an output transformer and a driving transformer for converting a d.c. input to an a.c. output, said circuit including in combination:

a. generator means connected to pass a frequency stabilized signal to said driving transformer to stabilize the switching frequency of said transistors to match the stabilized frequency of said signal;

b. switch means coupled to said driving transformer and responsive to said frequency stabilized signal to short circuit, alternately, portions of said driving transformer and force a flux reversal therein at points in time at which said frequency stabilized signal switches polarity thereby preventing any frequency drift; and c. current feedback means coupled to said driving transformer to provide sufficient power under a load condition.

2. The subject matter of claim 1, in which is said frequency stabilized signal constitutes a square wave of sufficient power to drive the inverter under a no load condition.

3. The subject matter of claim 2, in which said switch means comprise first and second solid state switches having control terminals for turning them on and off; and wave shaping circuits connected across the output of said generator means for providing triggering signals to said control terminals generated by said square wave to thereby effect conduction of said switches at the crossover points in time of said square wave.

4. The subject matter of claim 3, including means connected to said control terminals and responsive to a given signal to turn both of said solid state switches on simultaneously and thereby shut off said inverter and hold it shut off.

5. The subject matter of claim 4, in which said given signal is automatically generated in response to an overloading of said inverter.

* * * * *